United States Patent
Sattler et al.

(10) Patent No.: US 8,299,733 B2
(45) Date of Patent: Oct. 30, 2012

(54) METHODS FOR HYBRID VELOCITY CONTROL OF AT LEAST PARTIALLY RESONANT ACTUATOR SYSTEMS AND SYSTEMS THEREOF

(75) Inventors: Stefan Sattler, Gleisdorf (AT); Thomas Guidarelli, Farmington, NY (US)

(73) Assignees: New Scale Technologies, Inc., Victor, NY (US); Austriamicrosystems AG, Unterpremstaetten (AT)

( * ) Notice: Subject to any disclaimer, the term of this patent is extended or adjusted under 35 U.S.C. 154(b) by 376 days.

(21) Appl. No.: 12/608,726

(22) Filed: Oct. 29, 2009

(65) Prior Publication Data

US 2011/0101895 A1    May 5, 2011

(51) Int. Cl.
*H02N 2/00*    (2006.01)
(52) U.S. Cl. .................... 318/118; 318/116; 318/66
(58) Field of Classification Search .................... 318/118, 318/116, 66; 310/316.01; 363/21.02
See application file for complete search history.

(56) References Cited

U.S. PATENT DOCUMENTS

| | | | |
|---|---|---|---|
| 6,100,623 A | 8/2000 | Huang et al. | |
| 6,940,209 B2 | 9/2005 | Henderson | |
| 7,170,214 B2 | 1/2007 | Henderson | |
| 7,309,943 B2 | 12/2007 | Henderson et al. | |
| 7,339,306 B2 | 3/2008 | Henderson | |
| 2001/0004181 A1 | 6/2001 | Jaenker | |
| 2005/0029905 A1 | 2/2005 | Dal et al. | |
| 2010/0038996 A1* | 2/2010 | Xu et al. | 310/323.16 |
| 2011/0176334 A1* | 7/2011 | Imori | 363/21.02 |

FOREIGN PATENT DOCUMENTS

JP    2000350482 A1    12/2000

OTHER PUBLICATIONS

International Search Report for International Patent Application No. PCT/US2010/054715 (Jul. 28, 2011).

* cited by examiner

*Primary Examiner* — Karen Masih
(74) *Attorney, Agent, or Firm* — LeClairRyan, a Professional Corporation

(57) ABSTRACT

A method, computer readable medium, and system for controlling velocity of an at least partially resonant actuator system in accordance with embodiments of the present invention includes determining with an actuator controller computing device a sequence of full bridge and half bridge outputs to control an output velocity of an at least partially resonant actuator device. The actuator controller computing device controls a driver system to output a driving signal based on the determined sequence of full bridge and half bridge outputs. The driver system provides the driving signal to the at least one at least partially resonant actuator device.

21 Claims, 9 Drawing Sheets

US 8,299,733 B2

METHODS FOR HYBRID VELOCITY CONTROL OF AT LEAST PARTIALLY RESONANT ACTUATOR SYSTEMS AND SYSTEMS THEREOF

FIELD OF THE INVENTION

This invention relates to methods and systems for controlling velocity and, more particularly, to methods for hybrid velocity control of at least one partially resonant actuator systems and systems thereof.

BACKGROUND

Resonant actuator systems are used in a variety of different applications, for example, to move optics within cameras by way of example only. Examples of resonant actuator systems may be found in U.S. Pat. No. 6,940,209, titled, "Ultrasonic Lead Screw Motor"; U.S. Pat. No. 7,339,306, titled, "Mechanism Comprised of Ultrasonic Lead Screw Motor"; U.S. Pat. No. 7,170,214, titled, "Mechanism Comprised of Ultrasonic Lead Screw Motor"; and U.S. Pat. No. 7,309,943, titled, "Mechanism Comprised of Ultrasonic Lead Screw Motor," which are hereby incorporated herein by reference in their entireties. In these different applications, control over the velocity of operation while at the same time reducing power consumed for extended battery life and component life of the resonant actuator systems often is required.

To maximize the performance of a reduced voltage resonant actuator a full bridge driver could be used as it would double the available supply voltage as seen by the actuator. However, providing only a continuous full bridge output using the full bridge driver for such an actuator with a capacitive load over a wide supply voltage range can make speed regulation difficult as well as stress the electronics with regard to power dissipation as the supply voltage gets higher.

Modulation of pulse width has been used to provide effective regulation of output speed, but unfortunately saves little in power consumption because the switching frequency of full bridge driving switching sequence does not change. Alternately, application of burst mode has been used to effectively regulate speed and also to reduce power consumption, but unfortunately the use of burst mode adds undesirable audio noise to the output of the system.

SUMMARY

A method for controlling velocity of an at least partially resonant actuator system includes determining with an actuator controller computing device a sequence of full bridge and half bridge outputs to substantially control an output velocity of an at least one at least partially resonant actuator device. The actuator controller computing device controls a driver system to output a driving signal based on the determined sequence of full bridge and half bridge outputs and provides the driving signal to the at least one at least partially resonant actuator device.

A computer readable medium having stored thereon instructions for controlling velocity of an at least partially resonant actuator system including machine executable code which when executed by a processor, causes the processor to perform steps including determining with an actuator controller computing device a sequence of full bridge and half bridge outputs to substantially control an output velocity of an at least one at least partially resonant actuator device. The actuator controller computing device controls a driver system to output a driving signal based on the determined sequence of full bridge and half bridge outputs and provides the driving signal to the at least one at least partially resonant actuator device.

An at least partially resonant actuator system includes an actuator controller computing device configured to determine a sequence of full bridge and half bridge outputs to control an output velocity of an at least one at least partially resonant actuator device. A driver system controlled by the actuator controller computing device is configured to receive the determined sequence of full bridge and half bridge outputs and output a driving signal based on the determined sequence of full bridge and half bridge outputs. The driver system further provides the driving signal to the at least one at least partially resonant actuator device.

The present invention provides a number of advantages including providing a more effective method for controlling velocity of at least one partially resonant actuator systems. Using a hybrid full bridge-half bridge sequence for a driving signal provides both speed regulation and reduction in power consumed as the speed is reduced without adding audio noise.

DETAILED DESCRIPTION

Figure 1A:
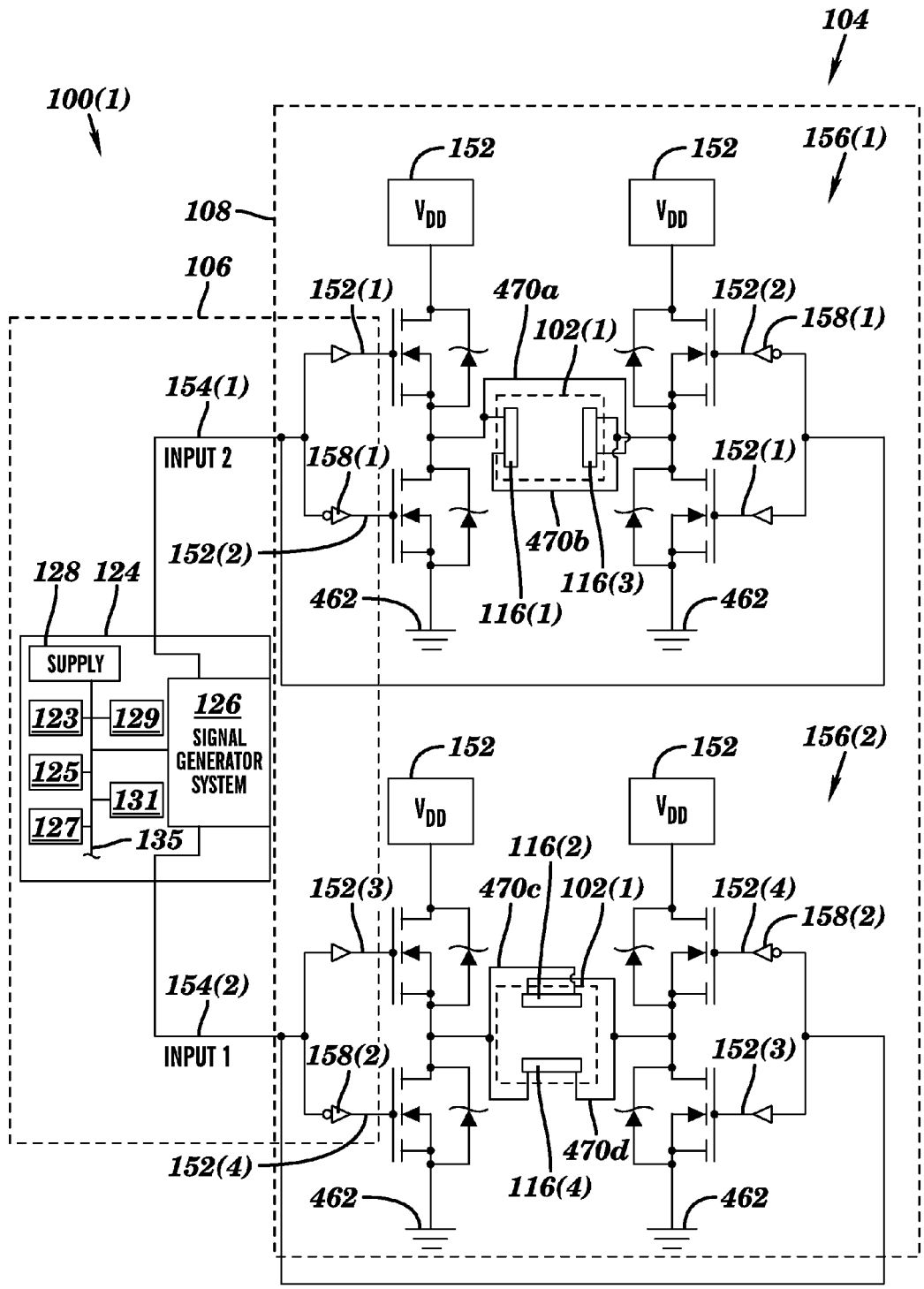
FIG. 1A is a partial block diagram, partial circuit diagram, and a partial end view of a resonant actuator system including a full bridge driving system in accordance with embodiments of the present invention.
Figure 1B:
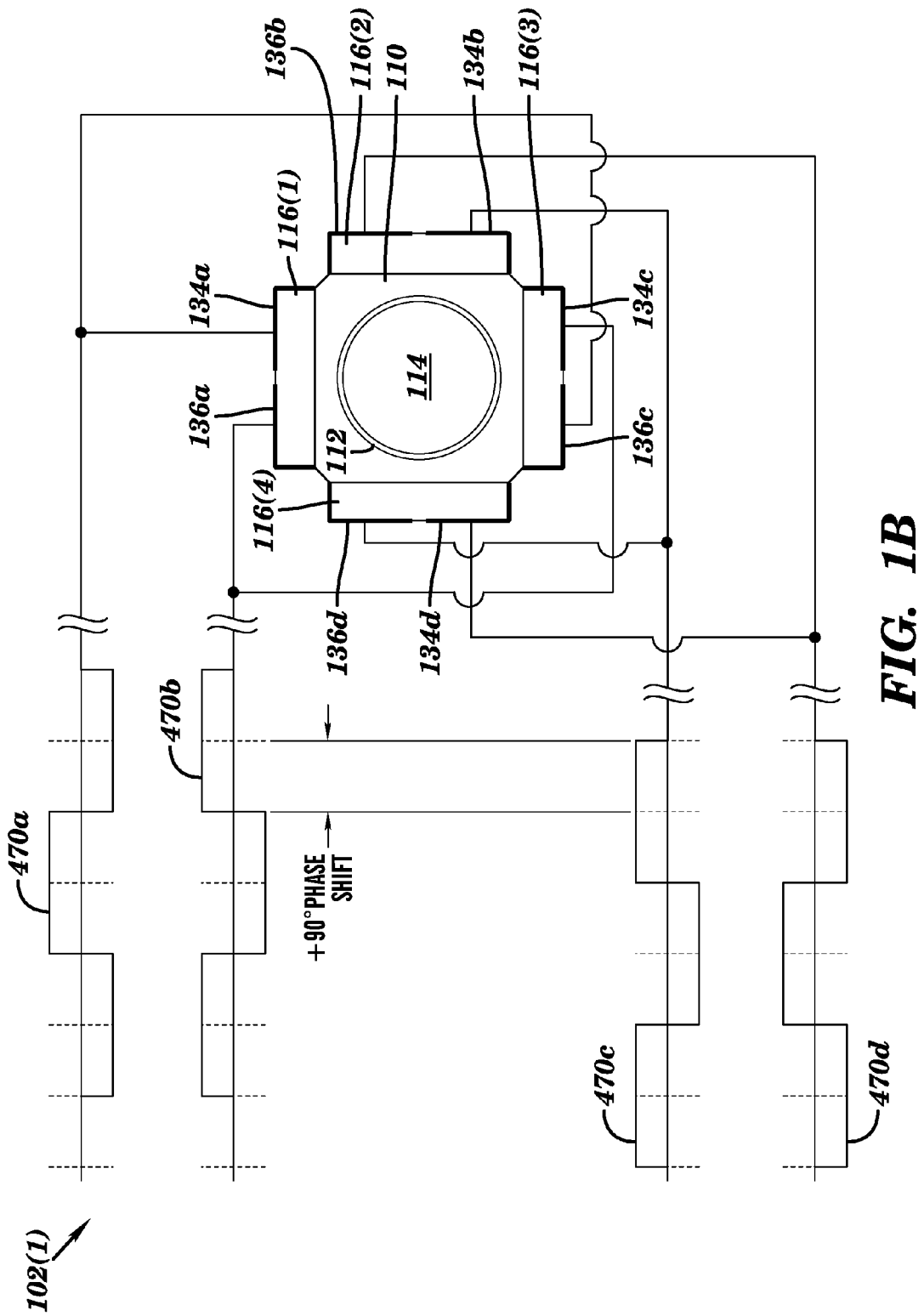
FIG. 1B is a partial circuit diagram, and a partial end view of a resonant actuator system with a linear actuator device driven by signals from the full bridge driving system of FIG. 1A in accordance with embodiments of the present invention.
Figure 2:
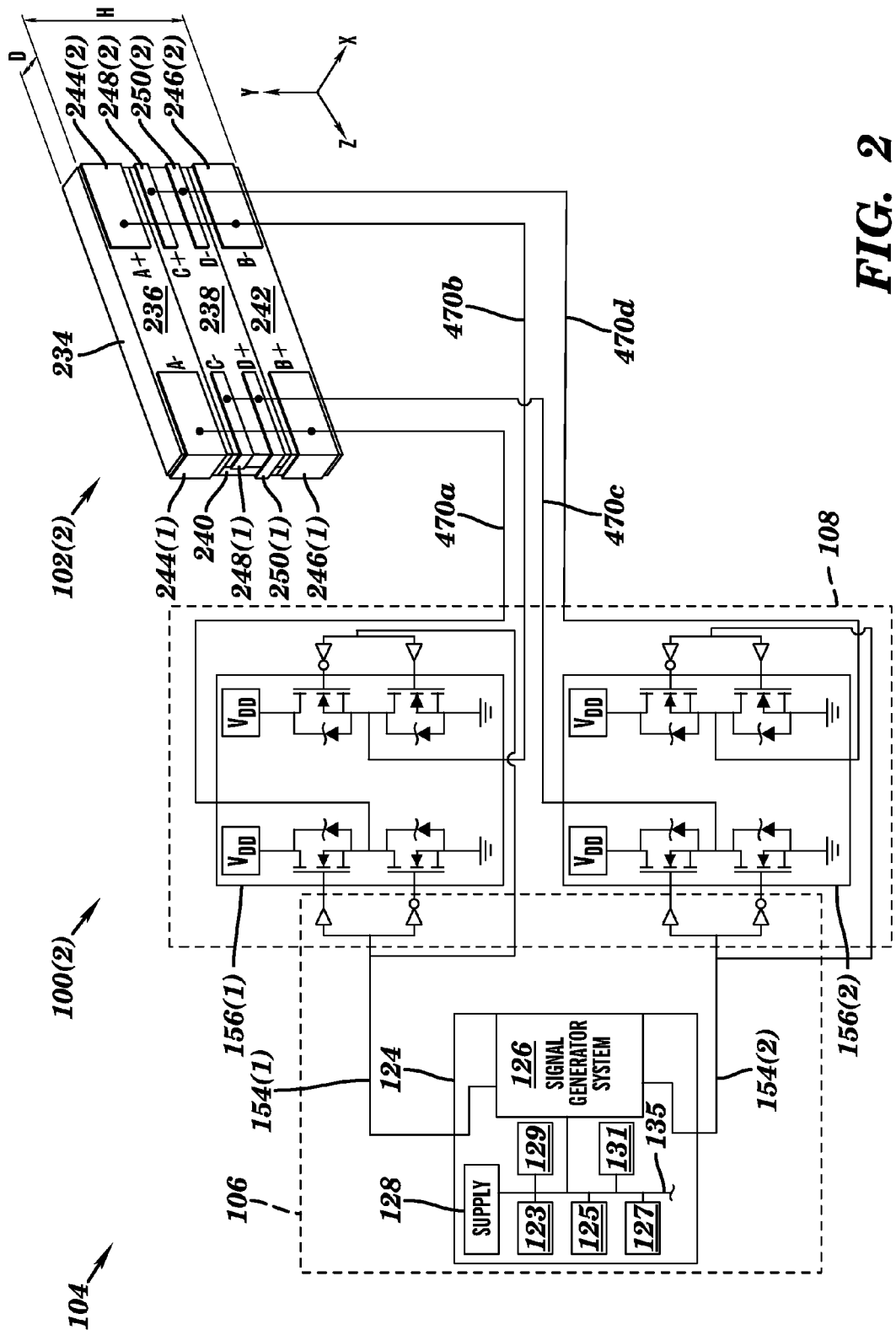
FIG. 2 is a partial block diagram, partial circuit diagram, and a partial end view of an at least partially resonant drive actuator system in accordance with embodiments of the present invention.

At least partially resonant actuator systems 100(1) and 100(2) with hybrid velocity control in accordance with exemplary embodiments of the present inventions are illustrated in FIGS. 1A, 1B and 2. The present invention provides a number of advantages including providing more effective and efficient operational velocity control of at least partially resonant actuator devices.

Referring to FIGS. 1A and 1B, the resonant actuator system 100(1) includes an actuator device 102(1) and a driving system 104 comprising an actuator controller system 106 and a driver assembly 108 and, although the system can comprise other numbers and types of systems, devices, and components which are connected in other manners. The present invention provides a number of advantages including providing more effective and efficient power consumption of at least partially resonant actuator devices.

Referring more specifically to FIG. 1B, the actuator device 102(1) generates a force to move a load, such as an optical lens by way of example, in a linear direction at a controlled velocity, although the actuator device 102(1) can move other types of loads in other directions. The actuator device 102(1) in this embodiment is the same in structure and operation as the linear actuator device illustrated and disclosed in U.S. patent application Ser. No. 12/228,923, filed Aug. 18, 2008 for, "Reduced-Voltage, Linear Motor Systems and Methods Thereof," which is herein incorporated by reference, although other types of actuator devices can be used.

The actuator device 102(1) includes an element 110 with a threaded passage 112, a threaded shaft 114, piezoelectric members 116(1)-116(4), further including "L" shaped electrodes 134a-d and 136a-d, respectively, as described in more detail below with respect to FIG. 1B, although the actuator device 102(1) can include other types and numbers of systems, devices, and components which are connected in other manners. The inner passage of the element 110 is threaded throughout its length, although the passage could have other configurations, such as being partially threaded. The threaded shaft 114 is screwed into the threaded passage 112 of the element 110 for rotation about and linear movement along the passage at a controlled velocity.

Each of the piezoelectric members 116(1)-116(4) comprises multiple layers of piezoelectric material, although other numbers and types of vibratory elements could be used. Each of the piezoelectric members 116(1)-116(4) changes length when subjected to a voltage differential. The piezoelectric members 116(1) and 116(3) are connected to substantially opposing sides of element 110 about threaded passage 112 and the piezoelectric members 116(2) and 116(4) also connected to substantially opposing sides of element 110 about threaded passage 112, although other numbers of vibratory members connected in other configurations could be used. The electrodes 134a-d and 136a-d are each coupled to one of the piezoelectric members 116(1)-116(4), as described below with reference to FIG. 1B, to apply the voltage differential across the piezoelectric members 116(1)-116(4) based on applied drive signals 470a-470d generated from input drive signals 152(1)-152(4) (also referred to herein as input driving signals 152(1)-152(4)), although other manners of coupling other types and numbers of drive signals to the vibratory members can be used.

Referring to FIG. 1B, the applied drive signals 470a-d are illustrated and shown being transmitted to respective piezoelectric members 116(1)-116(4) that bend the element 110 back and forth along a first plane in response to the applied drive signals 470a-d. The first applied drive signal 470a is an approximately square-wave voltage signal that is about 180 degrees out of phase from the second applied drive signal 470b, which is also an approximately square-wave voltage signal. Similarly, the third applied drive signal 470c is an approximately square-wave voltage signal that is about 180 degrees out of phase from the fourth applied drive signal 470d, which is also an approximately square-wave voltage signal. The cyclical, offset excitation of the piezoelectric members 116(1) and 116(3) and the piezoelectric members 116(2) and 116(4) causes a corresponding cyclic and orthogonal bending motion of the element 110 back and forth in the first and second planes. This bending motion of the element 110 causes the threaded shaft 114 to rotate and translate in the direction along the length of the threaded passage 112 at a velocity based on the applied drive signals.

The first and second applied drive signals 470a,b are transmitted through electrical traces that are attached via solder to "L" shaped electrodes 134a and 136a on the first member 116(1) and also to respective "L" shaped electrodes 134c and 136c, on the third member 116(3). The third and fourth applied drive signals 470c,d are transmitted through electrical traces that are attached via solder to respective "L" shaped electrodes 134b and 136b on the second member 116(2) and also to respective "L" shaped electrodes 134d and 136d on the fourth member 116(4). By way of example only, the "L" shaped electrodes 134a-d and 136a-d shown in FIGS. 1A and 1B can be located on longer edges of the members 116(1)-116(4).

The actuator controller system 106 in the driving system 104 in this embodiment is the same in structure and operation as, for example, the actuator controller system illustrated and disclosed in U.S. patent application Ser. No. 12/228,923, filed Aug. 18, 2008 for, "Reduced-Voltage, Linear Motor Systems and Methods Thereof" which is herein incorporated by reference, except as illustrated and described herein, although other types of actuator controller systems can be used. The actuator controller system 106 includes an actuator processing device 124 with a signal generator system 126, a supply voltage or voltage source 128, although the actuator controller system 106 can include other types and numbers of systems, devices, and components which are connected in other manners.

The actuator processing device 124 in the actuator controller system 106 includes a processor 123, a memory storage device 125, user input device 127, a display 129, a communication interface system 131, and the signal generator system 126 which are coupled together by a bus or other link 135, although other numbers and types of systems, devices, and components in other configurations can be used and the signal generator system 126 can be separate from the actuator processing device 124. The processor 123 executes a program of stored instructions for one or more aspects of the present invention as described herein, including for reducing velocity and power consumption of the actuator device 102(1).

According to some embodiments, actuator processing device 124 includes a phase shifting circuit to generate at least two low-voltage driving signals 154(1) and 154(2) which can be an approximate square wave, for example. The actuator processing device 124 is configured to phase shift one of the low-voltage driving signals 154(1) and 154(2) ninety degrees with respect to the other and to transmit the signals after further processing (e.g., by inverters 158(1) and 158(2)) to the first and second full bridge drive systems 156(1) and 156(2). Specifically, the first low-voltage driving signal 154(1) is transmitted to the first full bridge drive system 156(1) and the second input signal 156(2) is transmitted to the second full bridge drive system 156(2). According to some embodiments, the phase shifting circuit can be referred to as a limitation circuit.

The memory storage device 125 stores these programmed instructions for one or more aspects of the present invention as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium having instructions stored thereon for performing various steps of the invention, which is read from and/or written to by a magnetic, optical, or other reading and/or writing system that is coupled to the processor 123 can be used for the memory storage device 125.

Memory 125 includes an n-bit register (also referred to herein as an accumulator or a register accumulator) to store a value of the duty cycle used to determine a hybrid sequence of full bridge-half bridge outputs. The value of n can be variable depending upon a resolution in the value of the duty cycle required. For example, n-bit register can be an 8-bit register although other values of n can also be used, as known to one skilled in the art. Memory 125 can also store the hybrid full bridge-half bridge sequence determined by the actuator processing device 124 corresponding to various values of duty cycle.

The user input device 127 is used to input selections, such as a selected velocity for operation of the actuator device 102(1) or one or more duty cycle values to be stored in the memory 125, although the user input device could be used to input other types of data and actions and interact with other elements. The user input device 127 can include a computer keyboard and a computer mouse, although other types and numbers of user input devices can be used.

The display 129 is used to show the graphical user interface for inputting requests, such as a selected motor speed (forward and/or reverse) for the actuator device 102(1), the duty cycle, the hybrid full bridge-half bridge output and viewing the resulting response, although other types and amounts of information can be displayed in other manners. The display 129 can include a computer or mobile communications device display screen, such as a CRT or LCD screen, although other types and numbers of displays such as a light emitting diode (LED) could be used.

The communication interface system 131 is used to operatively couple and communicate between the actuator processing device 124 and the driver assembly 108 along with the actuator device 102(1) via one or more communications networks, although other types and numbers of connections, configurations, and communication manners can be used.

The signal generator system 126 generates at least two low-voltage driving signals 154(1) and 154(2) which are provided to full bridge drive systems 156(1) and 156(2) in driver assembly 108 in response to instructions from the actuator processing device 124, although the signal generator system could generate other numbers and types of signals which are provided to other types and numbers of systems or devices. Inverters 158(1) and 158(2) are coupled between the signal generator system 126 and the driver assembly 108 and each receive the low-voltage driving signals 154(1) and 154(2), respectively, which are inverted to generate additional input drive signals 152(2) and 152(4), respectively. The low voltage and inverted input drive signals 152(1), 152(2), 152(3), and 152(4) are input through the driver assembly 108 to drive the four piezoelectric members 116(1), 116(2), 116(3), and 116 (4), although other numbers and types of signals could be generated and used.

The voltage source 128 in the actuator controller system 106 is a battery supply system that supplies power to run the actuator processing device 124 and the driver assembly 108 (for ease of illustration the coupling to each $V_{DD}$ of the driver assembly 108 is not shown), although other types and numbers of power supplies which supply power to types and numbers of system, devices, and components can be used. By way of example only, voltage source 128 can be a battery in, for example, a cell phone, a camera, or a PDA.

Although an embodiment of the actuator controller system 106 with the actuator processing device 124 is described and illustrated herein, each of these systems could be implemented on any suitable computer system or device or an application specific integrated circuit or other programmable entity. For example, actuator processing device 124 can form or include a velocity adjustment system that adjusts applied drive signals 470a-d by applying hybrid full bridge-half bridge outputs by adjusting the duty cycle in response to an error between the selected and the actual velocities. It is to be understood that the systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, application specific integrated circuits, digital signal processors, and microcontrollers, programmed according to the teachings of the embodiments, as described and illustrated herein, and as will be appreciated by those ordinary skill in the art.

In addition, two or more computing systems or devices can be substituted for any one of the systems in any embodiment. Accordingly, principles and advantages of distributed processing, such as redundancy and replication also can be implemented, as desired, to increase the robustness and performance of the devices and systems of the embodiments. The embodiments may also be implemented on computer system, systems, or other devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

The driver assembly 108 in this embodiment is the same in structure and operation as the driver assembly illustrated and disclosed in U.S. patent application Ser. No. 12/228,923, filed Aug. 18, 2008 for, "Reduced-Voltage, Linear Motor Systems and Methods Thereof" which is herein incorporated by reference, although other types of driver assemblies can be used. The driver assembly 108 is a full bridge driver which includes full bridge drive systems 156(1) and 156(2) coupled to the voltage source 128, although the driver assembly 108 can include other numbers and types of systems, devices, assemblies, and components in other configurations.

By way of example only, the full bridge drive systems 156(1) and 156(2) amplify and split the input low-voltage driving signals 154(1) and 154(2), respectively into applied drive signals 470a-b and 470c-d, respectively. For example, one of the applied drive signals 470a,b is phase shifted 180 degrees relative to the other electrical signal to double the effective voltage differential across piezoelectric layers of the piezoelectric members 116(1) and 116(3). The first and second applied drive signals 470a,b are transmitted to piezoelectric members 116(1) and 116(3) via a flex circuit (not shown) to drive the members piezoelectric members 116(1) and 116 (3). Similarly, one of the applied drive signals 470c,d is phase shifted 180 degrees relative to the other electrical signal to double the effective voltage differential across piezoelectric layers of the piezoelectric members 116(2) and 116(4). The third and fourth applied drive signals 470*c,d* are transmitted to piezoelectric members 116(2) and 116(4) via the flex circuit to drive the piezoelectric members 116(2) and 116(4).

According to some embodiments, using a full bridge drive system 156(1) and 156(2) to transmit the applied drive signals 470*a-d* to their respective piezoelectric members 116(1)-116(4) allows for the driving system 104 to be commonly grounded at ground point 462. The electrodes 134*a-d* and 136*a-d* are floating relative to common ground and are driven independently, which eliminates a need for soldering a common ground wire to the element 110, as is typically required in linear motor systems. Eliminating the common ground wire soldered to the element 110 reduces the time and cost it takes to make a linear motor system, e.g., the actuator device 102(1).

The driver assembly has four outputs to provide the approximately square wave applied drive signals 470(*a*)-470(*d*) to the actuator device 102(1), although other types and numbers of outputs which provide other types and numbers of signals, such as sinusoidal shaped-signals by way of example only, can be used. One of the advantages of using a full bridge drive circuit is that the effective voltage differential across the positive electrode and negative electrode of each of the piezoelectric members 116(1), 116(2), 116(3), and 116(4) is twice the supply voltage, which effectively doubles the mechanical output as compared with a half bridge circuit with the same supply voltage, which may save space.

With reference to FIGS. 1A and 1B, according to some embodiments, the first piezoelectric member 116(1) and the third piezoelectric member 116(3) comprise a first pair of opposing members that operate together; and the second piezoelectric member 116(2) and the fourth piezoelectric member 116(4) comprise a second pair of opposing members that operate together. The applied drive signals 470*a,b* provided to the first pair of opposing members are phase shifted about 90 degrees relative to the applied drive signals 470*c,d* provided to the second pair of opposing members to cause the threaded shaft 114 to rotate and translate in the direction along a first axis of rotation. A positive 90 degree phase shift, will produce a positive or forward translation of the threaded shaft 114, where a negative 90 degree phase shift will produce a negative or backward translation of the threaded shaft 114. According to some embodiments, a frequency of applied drive signals 470*a-d* is substantially the same as the first bending mode resonance of the actuator device 102(1). While certain electrical signals and phase shifts have been described, it is contemplated that other frequency ranges, shapes, and phase differences of the applied drive signals 470*a-d* can be implemented.

Additionally, although not shown, the actuator device 102(1) can have a position or velocity sensor or other type of sensor which provides feedback on the measured speed of the actuator device 102(1) to be used in a closed feedback loop adjust the speed of the actuator device 102(1).

Referring to FIG. 2, an at least partially resonant drive actuator system 100(2) (also referred to herein as resonant actuator system 100(2)) in accordance with other embodiments of the present invention is illustrated. The resonant actuator system 100(2) is the same as resonant actuator system 100(1) in structure and operation, except as illustrated and described herein. Elements in resonant actuator system 100(2) which are like those in resonant actuator system 100(1) have like reference numerals. The resonant actuator system 100(2) in this embodiment is the same in structure and operation as the linear actuator device illustrated and disclosed in U.S. patent application Ser. No. 12/228,943, filed Aug. 18, 2008 for, "Semi-Resonant Driving Systems and Methods Thereof," which is herein incorporated by reference, although other types of actuator devices can be used.

The resonant actuator system 100(2) includes an actuator device 102(2) and a driving system 104 comprising an actuator controller system 106 and a driver assembly 108, although the system can comprise other numbers and types of systems, devices, and components which are connected in other manners. Since the driving system 104 with the actuator controller system 106 and the driver assembly 108 are the same as illustrated and described earlier with reference to FIGS. 1A and 1B, they will not be described here again.

The actuator device 102(2) generates a two-dimensional trajectory to frictionally couple to and drive a moveable load, such as an optical lens by way of example only, in either of at least two opposing directions, although the actuator device 102(2) can generate other types of trajectories, be coupled in other manners and at other locations, and move other types of loads in other directions. The semi-resonant or partially resonant actuator device 102(2) that generates the two-dimensional trajectory to frictionally couple to and drive a moveable load in this embodiment is the same in structure and operation as semi-resonant or partially resonant actuator device illustrated and disclosed in the above referenced U.S. patent application Ser. No. 12/228,943, which is herein incorporated by reference, although other types of actuator devices can be used.

The details of actuator device 102(2) including an asymmetrical, elongated structure 234 are disclosed in the above-incorporated U.S. patent application Ser. No. 12/228,943 will not be repeated here. For example, the elongated structure 234 includes four piezoelectric regions 236, 238, 240, and 242, and electrodes 244(1) and 244(2), electrodes 246(1) and 246(2), electrodes 248(1) and 248(2), and electrodes 250(1) and 250(2), although the actuator device 102(2) can comprise other numbers, types and shapes of structures with other numbers and types of regions and connectors. By way of example only, in alternative embodiments one of the two piezoelectric regions 236 and 242 and one of the piezoelectric regions 238 and 240, could be inactive which would reduce the drive amplitude, but otherwise would not alter the operation of the actuator system, although other combinations of active and inactive regions could be used.

Although, exemplary full bridge drivers have been described in FIGS. 1A-B and 2, it should be noted that the invention does not depend on the type of full bridge used. For example only, full bridge driver could be implemented on CMOS or bipolar and as switches or as current sources, depending upon the particular application.

Figure 3:
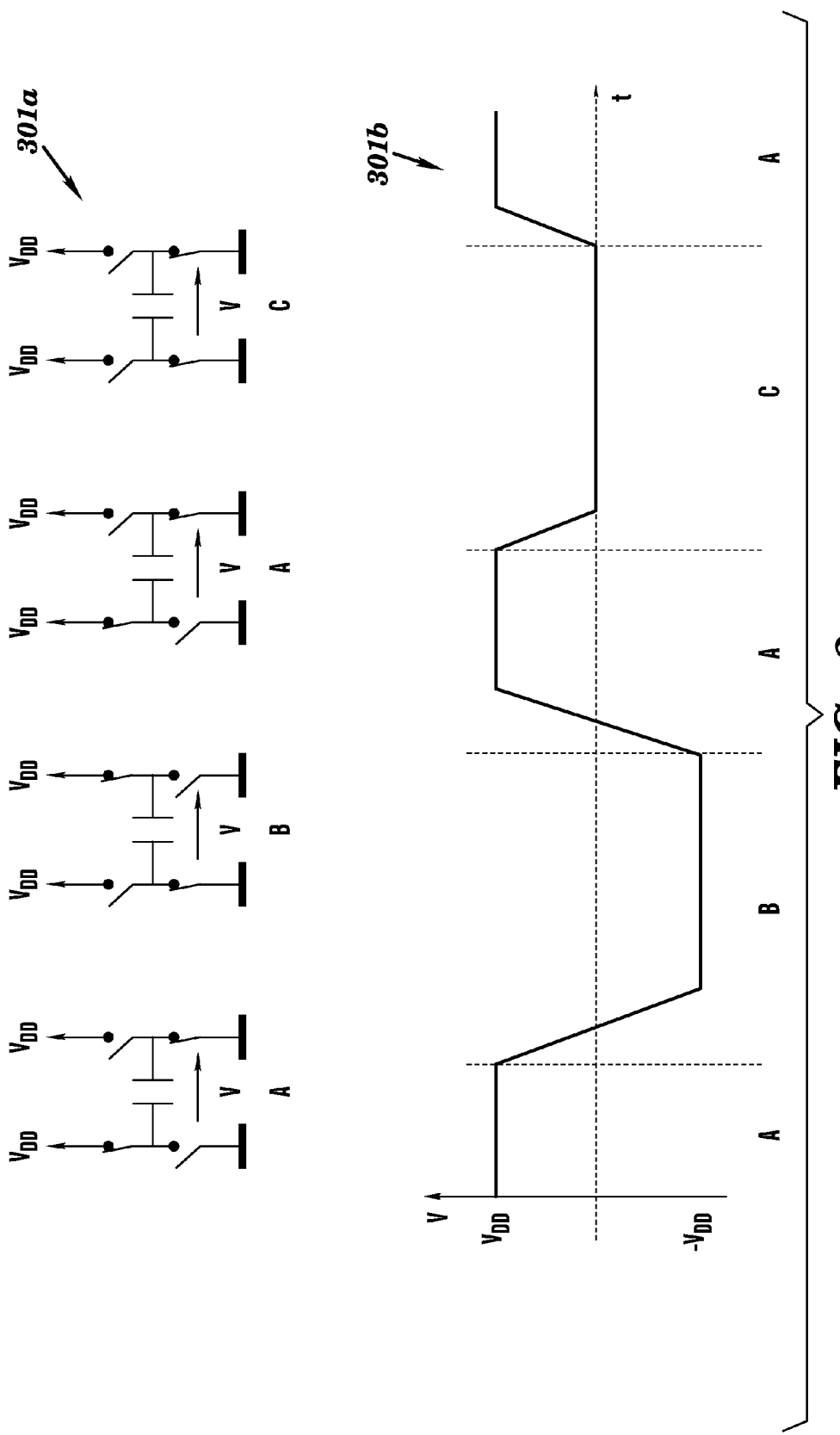
FIG. 3 is a hybrid control switching sequence with full bridge and half bridge switching states and voltage across load.

Referring to FIG. 3, according to one embodiment of the present invention, a hybrid control switching state sequence 301*a* and corresponding voltage 301*b* across the load is illustrated. By way of example only, a full voltage swing from $+V_{DD}$ to $-V_{DD}$ at an output of piezoelectric member 116(1) is shown. The voltages applied to piezoelectric members 116(2)-116(4) are substantially identical to the voltage applied to 116(1) except for a phase shift as described above with respect to the first and second full bridge drive systems 156(1) and 156(2). Using the driving system 104, a first switching state A in a hybrid control switching state sequence 301*a* is changed to a second switching state B and then back to the first switching state A. This corresponds to sections A-B-A in plot 301*b* for a full bridge output.

However, as set forth in greater detail below with respect to FIGS. 5-8, depending on value of duty cycle for resonant actuator systems 100(1) or 100(2) stored in memory 125, a third switching state C corresponding to a half bridge cycle is added pseudo-randomly between two full bridge cycles. Addition of the third switching state C results in output voltage at piezoelectric members 116(1)-116(4) changing to an intermediate value between $+V_{DD}$ to $-V_{DD}$ (e.g., 0 volts). This corresponds to sections C-A in plot 301b for a full bridge output.

Plot 301b forms an exemplary voltage representation of the hybrid switching sequence 301a to be provided by driving signals 152(1)-152(4) showing transition from a high to a baseline to a low voltage value for the full bridge output and transition from a high to a baseline voltage value for the half bridge output. Hybrid switching sequence 301b results in a better control of output velocity of a load attached to an actuator systems 100(1) and 100(2) described in FIGS. 1 and 2 since by insertion of half bridge cycles that consume lesser power compared to a full bridge only sequence, power consumption of the actuator systems 100(1) and 100(2) is reduced in proportion to the output velocity.

Figure 4:
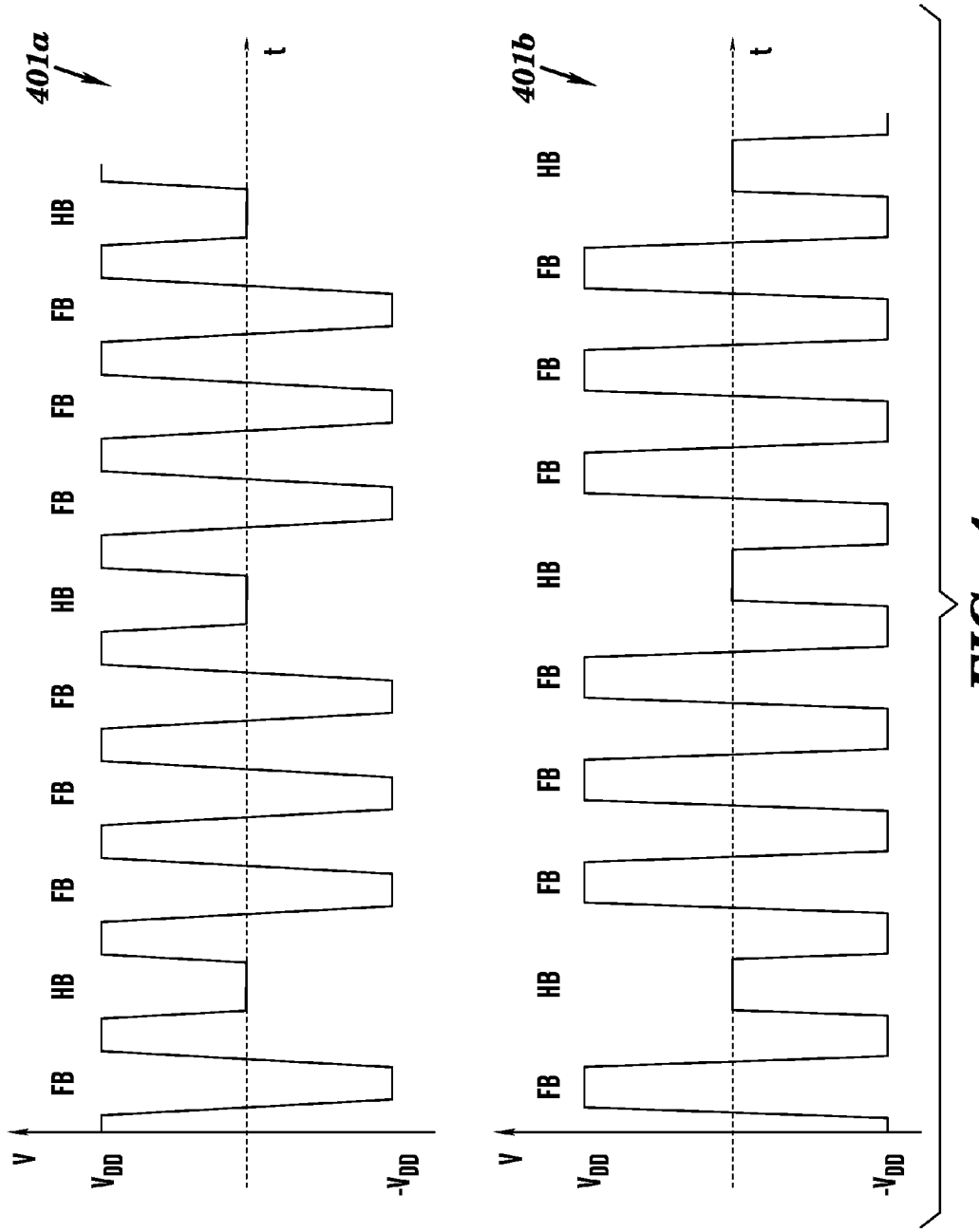
FIG. 4 is a graph of exemplary hybrid control switching sequences and voltage across load based upon a value of duty cycle between a full bridge and a half bridge output.

FIG. 4 further illustrates additional exemplary switching sequences 401a and 401b. Sequences 401a and 401b comprise hybrid full bridge-half bridge ("FB" and "HB") sequences that are applied to the driving signals 470a-d of actuator system 100(1), although other types of hybrid sequences can also be applied. Sequences 401a and 401b insert half bridge cycles between successive full bridge cycles based upon a duty cycle value between the half bridge and the full bridge cycles, to drive at actuator systems 100(1) and 100(2) described in FIGS. 1 and 2. Half bridge cycles can be inserted either at a high to low transition point at the end of the full bridge cycle (as shown by sequence 401a) or at a low to high transition point at an end of the full bridge cycle (as shown by sequence 401b). For example, in sequences 401a and 401b, the full-bridge output is disabled (or, turned off) after every third cycle. Selectively driving actuator device 102(1) or 102(2) according to hybrid sequences 401a or 401b limits electrical power provided to actuator device 102(1) or 102(2) by driver assembly 108 and thus controls the operational velocity output in proportion to power delivered by actuator device 102(1) or 102(2).

Figure 5:
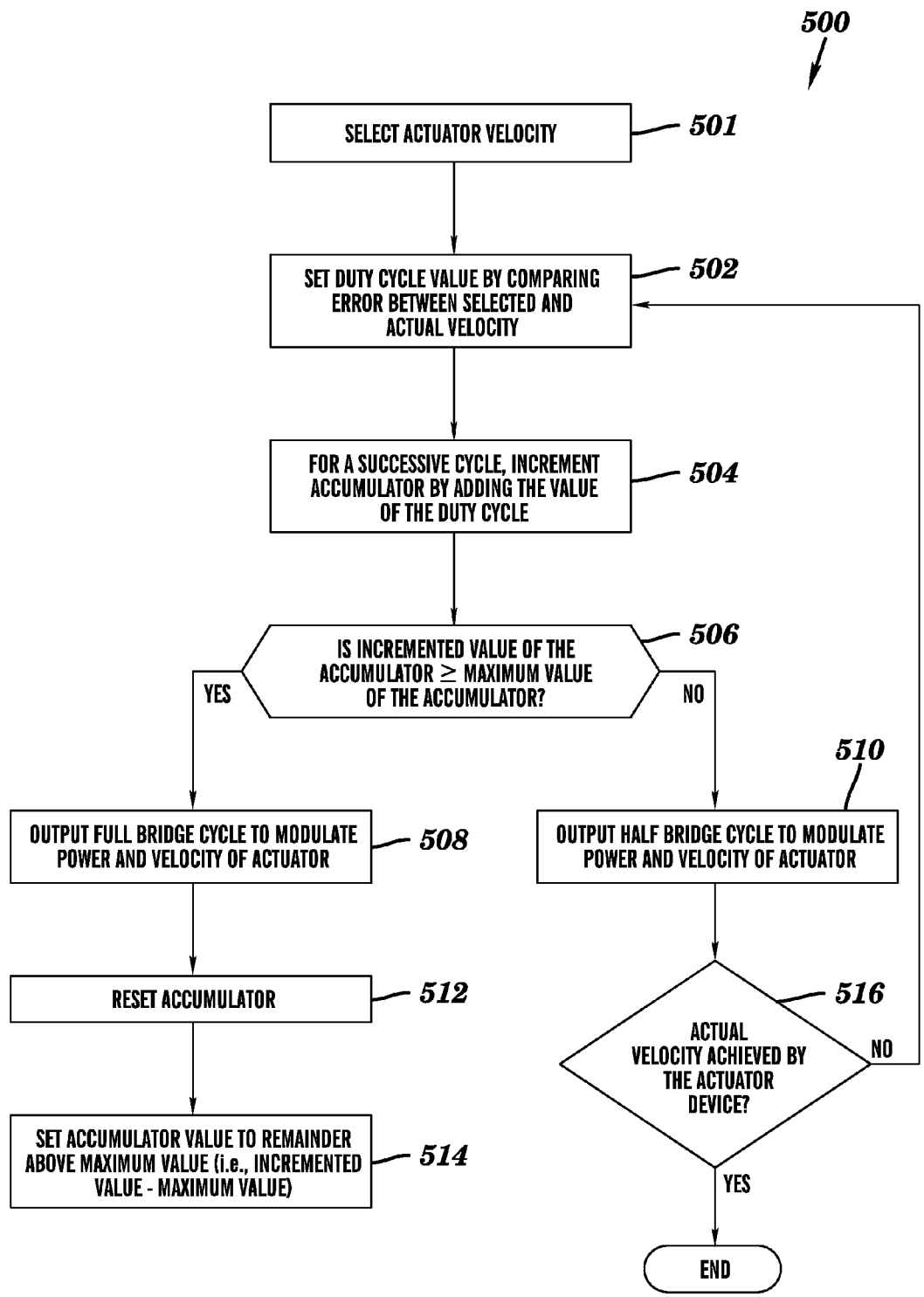
FIG. 5 is a flowchart of controlling velocity of an at least partially resonant actuator system in accordance with embodiments of the present invention.

Referring to FIGS. 1A-4, and FIGS. 6-7, operation of resonant actuator systems 100(1) and 100(2) for implementing an exemplary method for reducing power consumption of resonant actuator systems 100(1) and 100(2) will now be described using a flowchart 500 in FIG. 5 in accordance with embodiments of the present invention. For ease of discussion, only resonant actuator system 100(1) is being described using flowchart 500 and FIG. 5, although the discussion below is equally applicable to resonant actuator system 100(2).

In step 501, a selected actuator velocity is set by the user of resonant actuator system 100(1).

In step 502, a duty cycle value is calculated by comparing an error between the selected actuator velocity and the actual actuator velocity of the actuator device 102(1). Alternatively, the duty cycle value of the full bridge output may be pre-programmed into memory 125 of actuator processing device 124. By way of example only, the duty cycle value stored in memory 125 can be an 8-bit binary number where a 100% value of the duty cycle corresponds to a maximum binary value stored in the accumulator and a 0% duty cycle value corresponds to a minimum binary value stored in the accumulator. Further by way of example only, the duty cycle value can be 57% (as described below in FIG. 6), although other values of duty cycle (from 0% to 100%) may also be used, as will be apparent to one skilled in the art after reading this disclosure. The value of duty cycle can be determined based upon various criteria, for example, load size, actual velocity, amount of power to be delivered and power requirements of internal circuitry of resonant actuator system 100(1).

In step 504, after the duty cycle value has been set and stored in the accumulator of memory 125, in the next cycle of operation, the accumulator value is incremented by adding the duty cycle value to the previously stored value in the accumulator. In one example, the accumulator can be storing a value of zero before the value is incremented by the value of the duty cycle. Alternatively, in another example, the accumulator may store a binary value corresponding to the duty cycle value set/determined in step 502. Depending upon the duty cycle value, the increment value of step 504 can range anywhere from 0 (half bridge only) to a maximum (full bridge only).

The incrementing of the accumulator by the duty cycle value results in a new value to be store in the accumulator. In step 506, actuator processing device 124 determines the new value of the accumulator after addition of the duty cycle value to the accumulator. This new value is determined based on whether the incremented value is greater than the maximum value allowed in the accumulator (corresponding, for example, to an overflow condition of the accumulator) or is less than the maximum value designed to be stored in the accumulator. If the incremented value of the accumulator is greater than the maximum value of the accumulator, the flow proceeds to step 508, if not, the flow proceeds to step 510.

In step 508, corresponding to an overflow of the accumulator's maximum value, a full bridge output is enabled. For example, this can correspond to sections A-B-A in plot 301b for a full bridge output where the applied drive signals 470a-d are shaped so that a full bridge cycle is provided to the actuator device 102(1). Following outputting of a full bridge cycle in step 508, the flow proceeds to step 512.

In step 512, the accumulator is reset to zero value prior to the next output cycle. For example, resetting of the accumulator can be performed by changing the value of one or more bits (e.g., most significant bit or "MSB" of the accumulator). The resetting results in clearing the accumulator bits and can be performed by a hardware reset or a software reset or a combination of both.

In step 514, after the accumulator has been reset, the overflow value corresponding to the binary difference between the incremented value in step 504 and the maximum value of the accumulator register is stored as a new value in the accumulator.

In step 516, the actuator processing device 124 determines whether actuator device 102(1) has attained the selected actuator velocity. If yes, the flow ends. If not, the flow is repeated back from step 502 onwards where the duty cycle value is set again by based upon measured velocity of actuator device 102(1), added again to the accumulator value in step 504 and a determination is made in step 506 regarding the new value of the accumulator, as described above.

In step 510, if the new accumulator value is less than the maximum value of the accumulator, a half bridge cycle corresponding to section C-A in plot 301a is output and the applied drive signals 470a-d are accordingly modulated. The flow then proceeds to step 516 where a the actual velocity of actuator device 102(1) is measured and steps 502-516 are repeated, as described above.

By successively repeating steps 501-516 of flowchart 500, a hybrid sequence of full bridge and half-bridge cycles (e.g., sequences 401a and 401b) are applied to actuator device 102(1) and 102(2) using applied drive signals 470a-d. According to embodiments of the invention, the sequences 401a or 401b can be stored in memory 125 before applying to actuator device 102(1). Alternatively, sequences 401a or 401b may be determined and applied in real-time during operation of the actuator device 102(1). Further, to get a better resolution for the duty cycle of the full bridge, the size of the accumulator register is programmable and could be increased or expanded. Alternatively, depending upon specific applications, the n-bit accumulator register size may be reduced, as can be contemplated by one skilled in the art, after reading this disclosure. Additionally, depending on whether the operational velocity of resonant actuator systems 100(1) or 100(2) needs to be increased or decreased, in step 502, the duty cycle value is updated and accordingly the sequence of full bridge and half bridge outputs is determined corresponding to the obtained velocity.

Although the steps of the flowchart 500 have been described using resonant actuator system 100(1), steps 501-516 are equally applicable to resonant actuator system 100(2), or other actuator systems according to embodiments of this invention. Further, steps 501-516 can be performed in any other order suitable to carry out the embodiments of the invention and the order of steps shown in flowchart 500 is for example only and is not limiting.

The operation of the resonant actuator system 100(2) of FIG. 2 is the same as illustrated and described herein for actuator system 100(1) with reference to FIGS. 3-8, except as illustrated and described herein. With the operation of the resonant actuator system 100(2), the applied drive signals 470a-d are generated to drive actuator device 102(2) as illustrated and described in U.S. patent application Ser. No. 12/228,943, filed Aug. 18, 2008 for, "Semi-Resonant Driving Systems and Methods Thereof" which is herein incorporated by reference in its entirety, although other methods of driving can also be used. The actuator device 102(2) receives the applied drive signals 470a-d and operates as illustrated and described in the immediately above referenced U.S. patent application Ser. No. 12/228,943. For example, determining the hybrid full bridge-half bridge sequence 401a or 401b takes place in the same manner as for actuator device 102(1) as described above with respect to steps 501-516, and steps 501-516 are also performed for actuator device 102(2) in the same manner as for actuator device 102(1) and therefore are not being described in detail herein.

EXAMPLES

Figure 6:
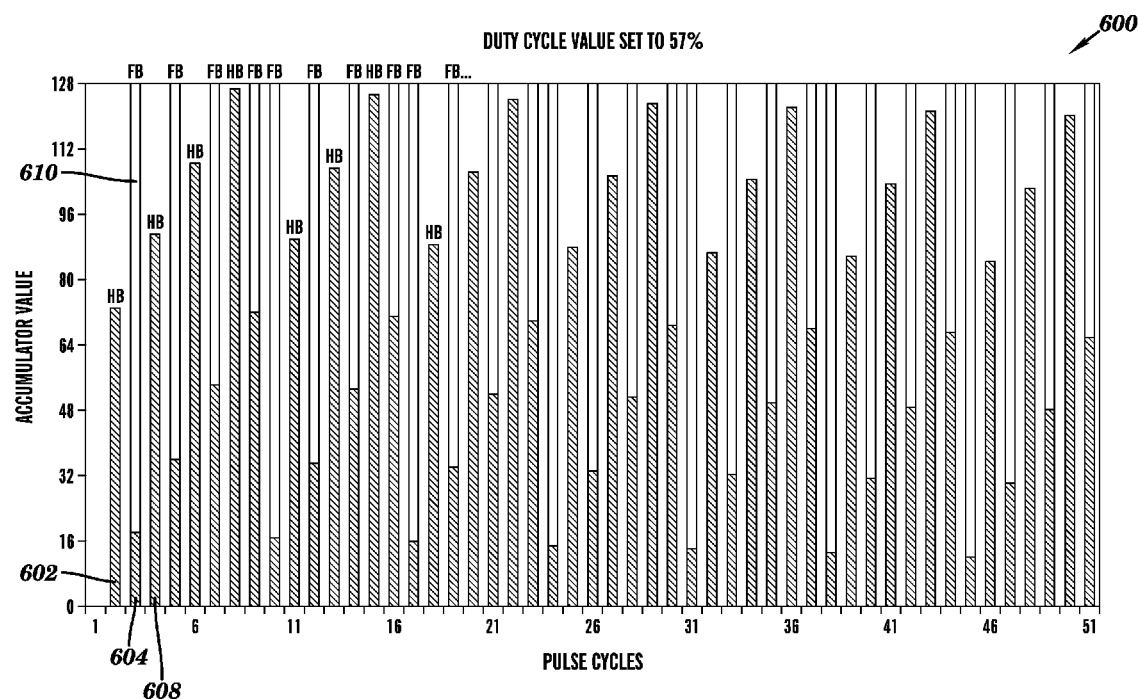
FIG. 6 is a graph showing a use of duty cycle accumulator to regulate full bridge cycles in accordance with embodiments of the present invention.

Referring to FIG. 6, an exemplary method to generate the hybrid full bridge-half bridge output sequence using actuator processing device 124 will now be described. In this example, the duty cycle of the output is set at 57% and the maximum value of the accumulator is set at 128 (equal to binary 1000 0000 with the MSB=1), although other values may also be used.

A duty cycle of 57% corresponds to a binary value equivalent to (57×128)/100=73 (approximately), as shown by bar 602 in FIG. 6. In this example, the initial starting value of the accumulator is set at 0 (equal to binary '0000 0000' with MSB=0) as shown in pulse cycle 1 of plot 600. As described in step 504 of flowchart 500 above, the value stored is now incremented by 73 resulting in accumulator value of 0+73=73 (equal to binary value of 0100 1001 with MSB=0) which is the height of bar 604. Since after incrementing, the value in the accumulator is less than the maximum value of 128, a half bridge output is provided to actuator device 102(1) in pulse cycle 2 (as explained in step 510 of flowchart 500). The half bridge output for pulse cycle 2 is denoted as "HB" in plot 600.

In the next pulse cycle 3, the accumulator value is incremented again by the duty cycle value 73 resulting in a new value 73+73=146. Decimal value 146 is above the maximum value 128 of the accumulator, shown in part as bar 610. Therefore, a full bridge cycle, (denoted by "FB") is provided to actuator device 102(1). Decimal value 146 corresponds to binary value 1001 0010 that has an MSB of '1'. Thus, the previous MSB '0' in the accumulator value 73 of pulse cycle 1 has now been reset. After a full bridge output has been provided to actuator device 102(1), the accumulator is cleared to store a difference between the incremented value 146 and maximum value 128, i.e., 146−128=18 (corresponding to binary 0001 0010) shown as bar 604 in pulse cycle 3 of plot 600. The value 18 becomes the new value stored in the accumulator.

In the next pulse cycle 4, the duty cycle value of 73 is again added to the accumulator value of 18 resulting in a decimal value 18+73=91, shown as bar 608. Since 91 is less than maximum value 128 of the accumulator, a half bridge output denoted as "HB" is provided to actuator device 102(1). Decimal 91 is equal to 0101 1011 that has an MSB '0'. Thus, in this pulse cycle, the MSB of the accumulator is not changed. The value 91 becomes the new value in the accumulator for the next pulse cycle 5.

The process of incrementing the accumulator as described above is repeated for successive pulse cycles resulting in a hybrid sequence of full bridge-half bridge outputs shown in plot 600 as HB-FB-HB-FB-HB-FB-HB-FB-FB- . . . , and so on, as described above in flowchart 500. Thus, by setting or resetting the MSB of an accumulator, a hybrid speed control for a motor in actuator device 102(1) is achieved, according to embodiments of the invention. Although a value of 57% for the duty cycle is used in this example to generate the hybrid full bridge-half bridge output sequence, one skilled in the art after reading this disclosure may use other values of the duty cycle to obtain other hybrid full bridge-half bridge output sequences (e.g., sequences 401a and 401b) in a similar manner as described in FIGS. 5-6 above.

For an exemplary accumulator, in a 100% duty cycle scenario, the increment value of the 8-bit register accumulator for a 100% duty cycle is calculated as (100*128)/100=128. Thus, the increment value for 100% duty cycle is 128. In other words, for a 100% duty cycle, the accumulator always has a value of 128. Thus, the full bridge output from driver assembly 108 is always on until the 8-bit register accumulator is reset by processor 123. In another example, when duty cycle value stored in the accumulator is 50%, the increment value of the 8-bit register is (50*128)/100=64. That is, the 8-bit register accumulator goes from a value of binary equivalent of 0 (8-bit), incremented by 64 to a binary equivalent of 64 (8-bit), and then to a binary equivalent of another increment of 64 resulting in the 8-bit register storing a binary 8-bit value of 128. Thus, the full bridge output from driver assembly 108 is activated every other cycle in case of 50% duty cycle. Following a similar explanation for a 33% duty cycle, driver assembly 108 outputs a full bridge cycle for every third cycle, and so on.

Figure 7:
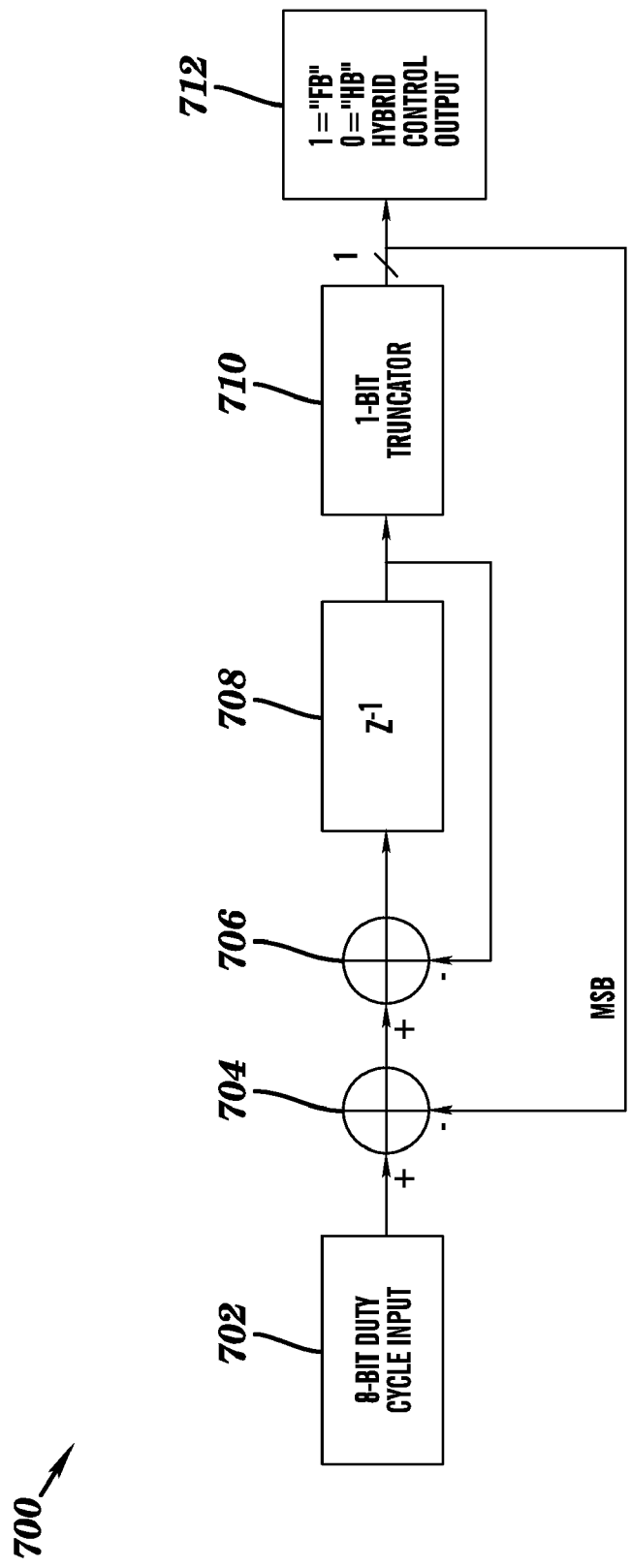
FIG. 7 is diagram illustrating an implementation of a first order sigma delta loop used to generate a hybrid full-bridge/half-bridge output sequence.

Referring to FIG. 7, yet another example to generate hybrid full bridge-half bridge output sequence according to embodiments of this invention is disclosed. FIG. 7 illustrates a sigma-delta loop 700 used to generate hybrid full bridge-half bridge output sequences (e.g., sequences 401a and 401b) based upon a 1-bit hybrid control output of sigma-delta loop 700.

Generation of the hybrid control output begins with an 8-bit duty cycle input 702. Again by way of example only, assuming a duty cycle value of 57% corresponding to 73 (equal to binary value of 0100 1001 with MSB=0) is provided to a subtractor 704. Also assuming that the initial value stored in the accumulator was 0 with an MSB of '0', the output of subtractor 704 is 0100 1001−0000 0000=0100 1001.

Binary 0100 1001 is further provided to an adder 706 that adds an output from a delay element 708. In this example, the delay element 708 outputs a binary 0100 1001 (equal to 73) and provides it back to adder 706. Thus, adder 706 performs the addition 73+73 (or equivalently, 0100 1001+0100 1001) resulting in a new value 73+73=146 (or equivalently, 10010010 with an MSB=1). Decimal value 146 is above the maximum value 128 of the accumulator. Decimal value 146 corresponds to binary value 1001 0010 that has an MSB of '1' output at 1-bit truncator 710 resulting in a full bridge output FB. Therefore, a full bridge cycle, (denoted by "FB" in box 712) is provided to actuator device 102(1). The previous MSB '0' of pulse cycle 1 has now been reset. After a full bridge output has been provided to actuator device 102(1), the accumulator is cleared to store a difference between the incremented value 146 and maximum value 128, i.e., 146−128=18 (corresponding to binary 0001 0010). The value 18 becomes the new value stored in the accumulator. The process of subtraction of the new MSB from the new accumulator value is performed again by subtractor 704. The results of adder 706 and 1-bit truncator 710 are processed to determine the hybrid sequence of full bridge and half-bridge cycles (e.g., sequences 401a and 401b) based upon a value of the MSB.

It is to be noted that although sigma-delta loop 700 is a first order sigma-delta loop, a higher order sigma-delta loop may be used to get a better performance for the generation of the pulse density modulated output signal. In other words, due to the digital approach it is easy to increase the resolution of full bridge-half bridge output cycles by using more bits for input and internal processing. A load, for example, a lens or other optical component, attached to actuator device 102(1) or 102(2) is moved at a controlled velocity based upon the generated sequence of '1's and '0's (i.e., the hybrid full bridge-half bridge sequences shown in FIGS. 3 and 4).

Due to the usage of sigma-delta technique described in FIG. 7, an output bit-stream can be generated which has a pseudo-random behavior. As a result, a plurality of switching patterns using the hybrid sequence of full bridge and half-bridge cycles (e.g., sequences 401a and 401b) are generated. Advantageously, such pseudo-random plurality of switching patterns do not generate a burst frequency component which could disturb a transmission or result in a tone in the audio band and rather, spread the switching frequency over a wider range reducing the single frequency components.

Figure 8:
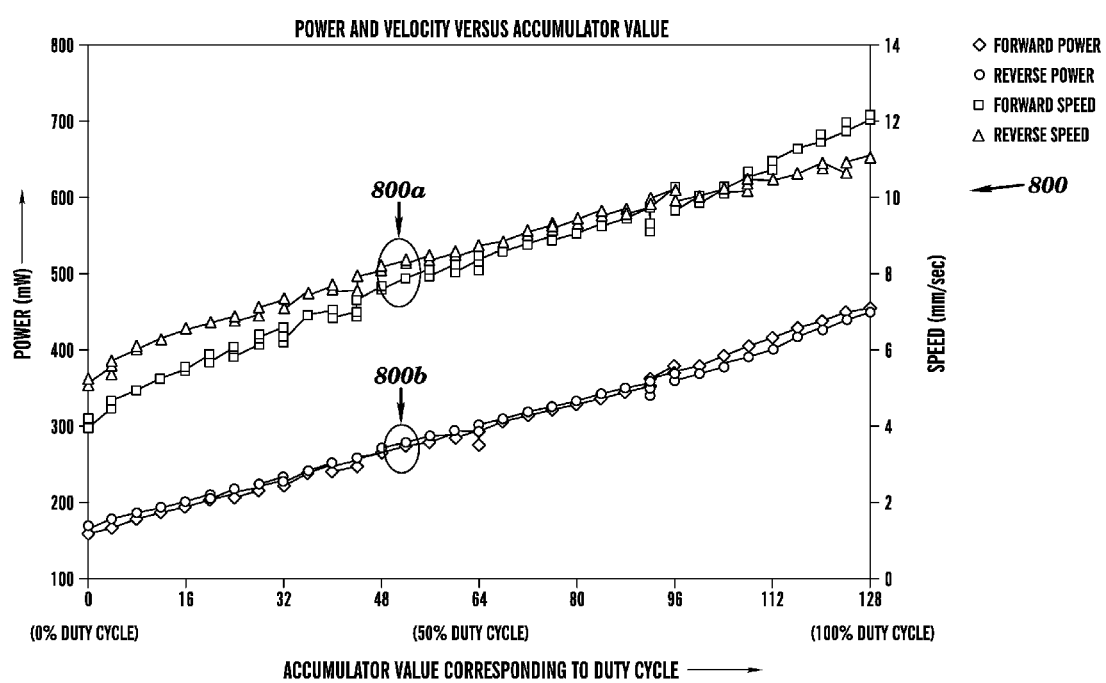
FIG. 8 is a graph showing variation in power and speed with respect to a value of duty cycle.

According to various embodiments of the present invention, FIG. 8 illustrates a plot 800 showing another advantage of the present invention. Plot 800 shows how by changing the duty cycle and corresponding accumulator value, the forward power and reverse power 800b and the forward and reverse speeds 800a of a motor in actuator devices 102(1) and 102(2) are controlled with high efficiency. By way of example only, as accumulator value increases from 0 to a maximum of 128, the forward and reverse speeds 800a also increase monotonically. Similarly, as accumulator value increases from 0 to a maximum of 128, the forward power and reverse power 800b used by resonant actuator systems 100(1) and 100(2) increases monotonically. As described above with respect to FIGS. 1-7, once a starting duty cycle value has been fixed, the forward power and reverse power 800b depends on the determined hybrid full bridge-half bridge output sequence. Thus, various aspects of the present invention are advantageous in smoothly controlling the speed and power of resonant actuator systems 100(1) and 100(2).

With the present invention, a hybrid full bridge half bridge cycle provided by a full bridge driver system is used to control the output velocity of an at least partially resonant actuator device. Additionally, the present invention is able to provide improved velocity control with lower power consumption and quieter operation than prior systems.

According to one embodiment of the invention output velocity of an actuator system is provided by a controlled or selective switching sequence which provides a linear transition between full bridge and half bridge driver cycles by turning off full bridge switch cycles and replacing them with half bridge switch cycles. The resulting power dissipation is then depending also on the duty cycle DC between full bridge and half bridge switching:

$$P = 4 \cdot C \cdot V_{DD}^2 \cdot f \cdot DC + C V_{DD}^2 \cdot f \cdot (1-DC) \quad (1)$$

In this scenario, the average voltage on the load is:

$$V_{DD\_LOAD} = 2 = V_{DD} \cdot DC + V_{DD} \cdot (1-DC) = V_{DD} \cdot (1+DC) \quad (2)$$

Since $DC \leq 1$, the average voltage $V_{DD\_LOAD}$ can be less than $2 \cdot V_{DD}$ (for a full bridge output). Selectively switching between full bridge and half bridge leads to a better speed control for the actuator system while at the same time reducing the power consumed by the actuator system as compared to an only full bridge cycle device.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for controlling velocity of an at least partially resonant actuator system, the method comprising:
   determining with an actuator controller computing device a sequence of full bridge and half bridge outputs to substantially control an output velocity of an at least one at least partially resonant actuator device;
   controlling with the actuator controller computing device a driver system to output a driving signal based on the determined sequence of full bridge and half bridge outputs; and
   providing with the driver system the driving signal to the at least one at least partially resonant actuator device.

2. The method as set forth in claim 1 wherein the driver system is a full bridge driver device.

3. The method as set forth in claim 2 wherein the full bridge driver device is configured to perform:
   switching by the full bridge driver device between a first and a second switching state for providing the full bridge output; and
   replacing by the full bridge driver device one of the first and the second state by a third switching state for providing the half bridge output based upon the determined sequence of full bridge and half bridge outputs.

4. The method as set forth in claim 2 wherein the determining further comprises:
   determining with the actuator controller computing device a duty cycle value for the full bridge driver device based upon a measurement of the output velocity;
   incrementing with the actuator controller computing device an accumulator by adding the determined duty cycle value to a value of the accumulator;

outputting by the actuator controller computing device a half bridge cycle when the incremented value is less than a predetermined value of the accumulator; and outputting by the actuator controller computing device a full bridge cycle when the incremented value is more than the predetermined value of the accumulator, wherein successively outputting the half bridge cycle and outputting the full bridge cycle forms the determined sequence of full bridge and half bridge outputs.

5. The method as set forth in claim 1 wherein the providing further comprises providing with the driver system the half bridge output at an end of at least one of a low to high transition point of the full bridge output and at a high to low transition point of the full bridge output.

6. The method as set forth in claim 1 further comprising:
controlling with the actuator controller computing device the output velocity of the at least one at least partially resonant actuator device in proportion to an amount of power consumed by the at least partially resonant actuator system, wherein the amount of power consumed depends upon the determined sequence of full bridge and half bridge outputs.

7. The method as set forth in claim 3 wherein the switching by the full bridge driver device between a first and a second switching state is at a fixed frequency that is substantially equal to a mechanical resonant frequency of the at least one of one or more at least partially resonant actuator devices.

8. A non-transitory computer readable medium having stored thereon instructions for controlling velocity of an at least partially resonant actuator system comprising machine executable code which when executed by at least one processor, causes the processor to perform steps comprising:
determining a sequence of full bridge and half bridge outputs to substantially control an output velocity of an at least one at least partially resonant actuator device;
controlling a driver system to output a driving signal based on the determined sequence of full bridge and half bridge outputs; and
providing the driving signal to the at least one at least partially resonant actuator device.

9. The medium as set forth in claim 8 wherein the driver system is a full bridge driver device.

10. The medium as set forth in claim 9 wherein the full bridge driver device is configured to perform:
switching between a first and a second switching state for providing the full bridge output; and
replacing one of the first and the second state by a third switching state for providing the half bridge output based upon the determined sequence of full bridge and half bridge outputs.

11. The medium as set forth in claim 9 wherein the determining further comprises:
determining a duty cycle value for the full bridge driver device based upon a measurement of the output velocity;
incrementing an accumulator by adding the determined duty cycle value to a value of the accumulator;
outputting a half bridge cycle when the incremented value is less than a predetermined value of the accumulator; and
outputting a full bridge cycle when the incremented value is more than the predetermined value of the accumulator,
wherein successively outputting the half bridge cycle and outputting the full bridge cycle forms the determined sequence of full bridge and half bridge outputs.

12. The medium as set forth in claim 8 wherein the providing further comprises providing the half bridge output at an end of at least one of a low to high transition point of the full bridge output and at a high to low transition point of the full bridge output.

13. The medium as set forth in claim 8 wherein the instructions comprising machine executable code which when executed by the at least one processor, causes the processor to further perform controlling the output velocity of the at least one at least partially resonant actuator device in proportion to an amount of power consumed by the at least partially resonant actuator system, wherein the amount of power consumed depends upon the determined sequence of full bridge and half bridge outputs.

14. The medium as set forth in claim 10 wherein the switching is at a fixed frequency that is substantially equal to a mechanical resonant frequency of the at least one of one or more at least partially resonant actuator devices.

15. An at least partially resonant actuator system comprising:
an actuator controller computing device configured to determine a sequence of full bridge and half bridge outputs to substantially control an output velocity of an at least one at least partially resonant actuator device; and
a driver system controlled by the actuator controller computing device configured to receive the determined sequence of full bridge and half bridge outputs and output a driving signal based on the determined sequence of full bridge and half bridge outputs, wherein the driver system provides the driving signal to the at least one at least partially resonant actuator device.

16. The at least partially resonant actuator system as set forth in claim 15 wherein the driver system is a full bridge driver device.

17. The at least partially resonant actuator system as set forth in claim 16 wherein the full bridge driver device is configured to:
switch between a first and a second switching state for providing the full bridge output; and
replace one of the first and the second state by a third switching state for providing the half bridge output based upon the determined sequence of full bridge and half bridge outputs.

18. The at least partially resonant actuator system as set forth in claim 16 wherein the actuator controller computing device configured to is further configured to:
determine a duty cycle value for the full bridge driver device based upon a measurement of the output velocity;
increment an accumulator by adding the determined duty cycle value to a value of the accumulator;
output a half bridge cycle when the incremented value is less than a predetermined value of the accumulator; and
output a full bridge cycle when the incremented value is more than the predetermined value of the accumulator,
wherein successively outputting the half bridge cycle and the full bridge cycle forms the determined sequence of full bridge and half bridge outputs.

19. The at least partially resonant actuator system as set forth in claim 15 wherein the half bridge output is provided at an end of at least one of a low to high transition point of the full bridge output and at a high to low transition point of the full bridge output.

20. The at least partially resonant actuator system as set forth in claim 15 wherein the actuator controlling device is further configured to control the output velocity of the at least one at least partially resonant actuator device in proportion to an amount of power consumed by the at least partially resonant actuator system, wherein the amount of power consumed depends upon the determined sequence of full bridge and half bridge outputs.

21. The system as set forth in claim 17 wherein the switch between a first and a second switching state is at a fixed frequency that is substantially equal to a mechanical resonant frequency of the at least one of one or more at least partially resonant actuator devices.

* * * * *